United States Patent [19]

Haendle et al.

[11] 4,161,755

[45] Jul. 17, 1979

[54] TELEVISION PICK-UP SYSTEM

[75] Inventors: Joerg Haendle, Erlangen; Heinz Horbaschek, Frauenaurach; Hartmut Sklebitz, Erlangen, all of Fed. Rep. of Germany

[73] Assignee: Siemens Aktiengesellschaft, Berlin & Munich, Fed. Rep. of Germany

[21] Appl. No.: 870,754

[22] Filed: Jan. 19, 1978

[30] Foreign Application Priority Data

Jan. 31, 1977 [DE] Fed. Rep. of Germany ....... 2703836

[51] Int. Cl.² ............................................. H04N 5/197
[52] U.S. Cl. .................................... 358/219; 358/111; 358/221
[58] Field of Search ................ 358/111, 219, 221, 163, 358/169

[56] References Cited

U.S. PATENT DOCUMENTS

| 3,287,496 | 11/1966 | Webb | 358/219 |
| 3,584,146 | 6/1971 | Cath et al. | 358/221 |
| 3,691,302 | 9/1972 | Gaebele et al. | 358/219 |

FOREIGN PATENT DOCUMENTS 1017650 10/1957 Fed. Rep. of Germany.

Primary Examiner—Robert L. Griffin
Assistant Examiner—Joseph A. Orsino, Jr.
Attorney, Agent, or Firm—Hill, Van Santen, Steadman, Chiara & Simpson

[57] ABSTRACT

In television transmission of medical X-ray photographs and in television X-ray fluoroscopy (e.g. during surgery), where a great brightness contrast range is presented, the illustrated system obtains a blurred video signal representative of the brightness of relatively large regions of the visible light image and adjustably selects high amplitude parts of such signal to synchronously modulate the scanning electron beam of a storage type television camera tube. In this way darker image areas are transmitted with full contrast for reproduction of fine image details as particularly required in medical X-ray technology, while excessively bright areas are attenuated to a desired degree.

3 Claims, 1 Drawing Figure

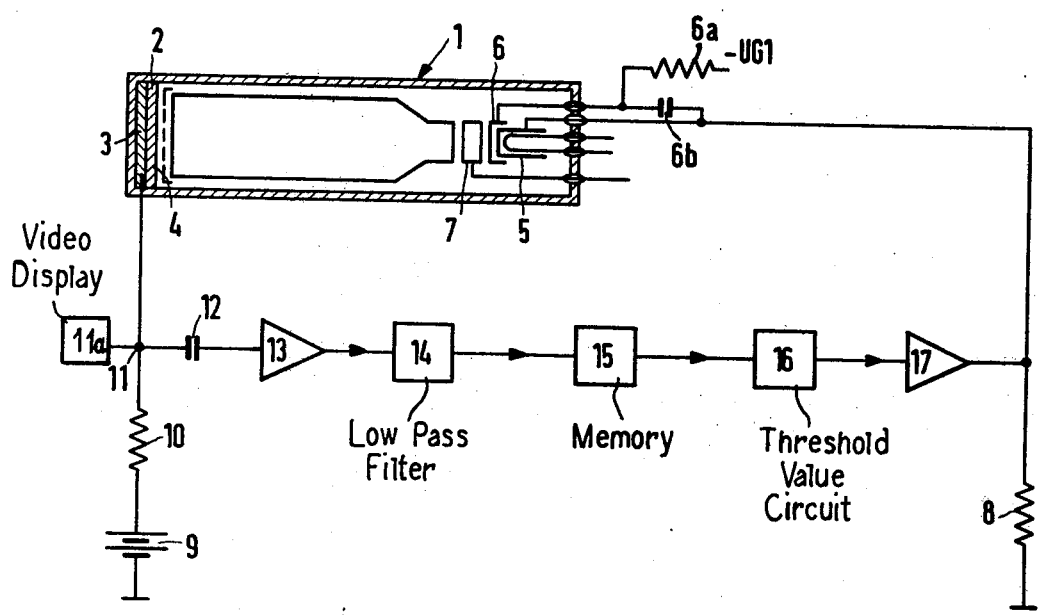

TELEVISION PICK-UP SYSTEM

BACKGROUND OF THE INVENTION

The invention relates to a television pick-up system particularly as employed in medical X-ray technology, comprising a television camera which contains a television camera tube of the vidicon type, which is provided with a signal plate (or electrode) with a photosensitive layer and a free surface of said layer, comprising devices for producing an electron beam as well as for deflecting and focusing the electron beam onto the signal plate, comprising means for adjusting the cathode potential of the television camera tube, and comprising an installation for processing the video signal picked off from the signal plate.

Television pick-up systems of this type are known wherein the potentials at the control grid and at the cathode of the television camera tube are constant. In television pick-up systems of this type, during the transmission of images with a great contrast ratio; for example, during the transmission of X-ray photographs, the difficulty which arises is that when the potentials are adjusted such that the bright locations can still be satisfactorily transmitted, the contrast of the dark picture locations is strongly reduced. For example, this problem occurs during the transmission of a thorax-radiograph which, in general, exhibits very bright lung fields (or areas). The transmission of the bright image locations can, indeed, be guaranteed; for example, in the case of an antimony trisulfide vidicon, by reducing the cathode potential and the potential at the control grid (grid no. 1) or by stopping down the optical aperture; however, as mentioned, this results in an undesirable decrease in the contrast of the dark image regions.

In television X-ray fluoroscopy, above all in the case of surgical television, the desire for a greater dynamic range of the television camera tube also exists. In the known television pick-up devices, namely, the contrast control of the X-ray television system is generally set relatively low during fluoroscopy, in order to still be able to effect a good transmission of subject-dependent signal peaks. However, the contrast of the dark image regions is thereby strongly reduced.

SUMMARY OF THE INVENTION

The object underlying the invention consists in producing a television pick-up device of the type initially cited in which, pursuant to a high contrast of the television camera tube, the contrast of dark image regions is optimally reproduced.

In accordance with the invention, this object is achieved by virtue of the fact that a memory and a spatial frequency low-pass filter are connected to the signal plate of the television pick-up tube, and that the output of this circuit arrangement is connected with means for the adjustment of the cathode potential of the television camera tube such that the cathode potential and the potential at the control grid (grid no. 1) are more positive the brighter the image location corresponding to the respective output signal of the circuit arrangement. In the inventive television pick-up device, bright image locations are transmitted in an attenuated fashion already during conversion into electric signals in the television pick-up tube. Since the correction signal determining the cathode potential and the potential at the control grid of the television camera tube is obtained from the averaging of (or the formation of a mean value from) adjacent image points with the aid of the spatial frequency low pass filter, there is associated with the improvement in the reproduction of the contrasts of dark image locations at a high dynamic range, a large-area contrast compensation; i.e., the large-area image contrasts are attenuated, whereas the fine image details are reproduced in a particularly high-contrast fashion which is desirable in X-ray technology. Because the modulating correction signal for the cathode potential and the potential at the control grid originates from an intermediate memory (or storage), and an averaging (or mean value formation) among the information of adjacent image points; i.e., the formation of a non-sharp (or blurred) image, takes place, interfering edge effects are avoided. The increase in dynamics according to the principle illustrated is applicable in the case of television pick-up tubes having a signal current-signal voltage-dependency; for example, in the case of the antimony trisulfide vidicon.

Further details of the invention shall be apparent from the sub-claims, and other objects, features and advantages will be apparent from the following detailed description of an exemplary embodiment which is illustrated on the accompanying sheet of drawings.

BRIEF DESCRIPTION OF THE DRAWING

The single FIGURE is a diagrammatic longitudinal sectional view of a television camera, with a contrast control arrangement according to the present invention connected therewith.

DETAILED DESCRIPTION

An antimony trisulfide vidicon 1 is illustrated in the drawing manifesting a signal plate 3 coated with a photoconductive layer 2 and a free surface 4 of the photoconductive layer 2. An electron beam is emitted by a cathode 5, which beam is formed by suitable potentials at grids 6 and 7. It impinges upon the free surface 4. Cathode 5 is connected to ground via a cathode resistance 8 whereas control grid 6, which is referred to as grid number one in conventional linguistic usage, is connected via a highly resistive (or ohmic) resistance 6a to a negative potential UG1, and, via a coupling capacitor 6b, to cathode 5. There is connected between cathode 5 and signal plate 3 a D.C. voltage source 9. The signal plate 3 is connected with the positive terminal of source 9 via a resistance 10. The optical image to be transmitted is focussed on signal plate 3 in the conventional manner. By means of a non-illustrated deflection device for the electron beam, the latter is moved in a line-by-line fashion over the free surface 4, thus effecting charge reversals (or recharges) which are available at the plate connection in the form of a signal current. A voltage corresponding to the signal current is tapped off at point 11 and is available there for further processing.

A circuit arrangement is disposed between signal plate 3 and cathode 5, consisting of a coupling capacitor 12, an amplifier 13, a spatial frequency low pass filter 14, a memory 15, a threshold value circuit 16, and an additional amplifier 17. The spatial frequency low pass filter 14 forms the mean values of the signals of adjacent image points.

The sample embodiment illustrated in the drawings serves the purpose of transmission of static images; for example X-ray images. The first television half-image (or field), after processing in the spatial frequency low pass filter 14, is stored in memory 15 in the form of an unsharp (or blurred) image, and subsequently memory 15 is interrogated synchronously with the movement of the beam of the image pick-up tube 1. Accordingly, there is connected to the output of memory 15 a reproduced filtered video signal corresponding to a non-sharp image, proceeding synchronously with the currently produced video signal at location 11 due to the scanning beam of the camera tube. The threshold value circuit 16 allows those components of the reproduced filtered video signal to pass through which exceed predetermined values and therefore correspond to image locations exceeding a predetermined brightness. Thus, through the output signal of the threshold value stage 16, the cathode potential of television pick-up tube 1, which is an antimony trisulfide vidicon, is modulated via amplifier 17, and the potential at grid 6 is also modulated via coupling capacitor 6b. These potentials become more positive when amplifier 17 delivers an output signal; namely they become more positive the brighter the scanned image location. Accordingly, in this case, the electron beam of image pick-up tube 1 recharges (or reverse charges) the free surface 4 to a more positive cathode potential. Thus, given an equal brightness step (or jump), the potential difference occurring is smaller in the case of great peak brightness than in the case of low peak brightness. This smaller potential difference corresponds to a lower signal plate voltage which, in the case of an antimony trisulfide vidicon, brings about a correspondingly smaller signal current wih equal illumination intensity.

The invention is suitable for the transmission of non-static images; for example, for X-ray fluoroscopy. In this case, precaution must be exercised to ensure that memory 15, subsequent to the scanning of a half image (or field), is erased, and that the next half image (or field) is newly written in the latter. The circuit arrangement 14, 15, can be constructed in analog as well as in digital technology.

In the sample embodiment, a spatial frequency low pass filter 14 is disposed in front of memory 15. However, within the framework of the invention, memory 15 can also be arranged directly at the output of amplifier 13 and the spatial frequency low pass filter 14 between memory 15 and threshold value member 16. In this case, mean value formation (or averaging) among the signals of adjacent image points proceeds subsequent to the storage of an unprocessed television half image (or field).

The potential changes at cathode 5 and at grid 6 may proceed in linear or non-linear dependency upon the output signal of the threshold value circuit.

The drawing additionally illustrates an installation 11a connected to point 11 for the purpose of processing the video signal tapped off from signal plate 3. Installation 11a may be e.g. a video display unit.

The term "spatial frequency low pass filter" is synonymous with "frequency domain or frequency spectrum low pass filter", and designates a conventional low pass filter which transmits low frequency components of the input signal, while attenuating high frequency components.

It will be apparent that many modifications and variations may be effected without departing from the scope of the novel concepts and teachings of the present invention.

We claim as our invention:

1. An image pick-up system comprising a television camera having a television camera tube including a cathode, a grid, and a signal plate having a photosensitive layer with a free surface, said camera tube being operable for producing an electron beam, and for deflecting and focusing the electron beam onto the signal plate, comprising means for adjusting the cathode potential of the television camera tube, and comprising an installation for processing the video signal tapped off from the signal plate, and a circuit arrangement comprising a memory (15) and a low pass filter (14) connected in series to form a series circuit connected to the signal plate (3), and the output of the circuit arrangement (14, 15) being connected with the means (17) for adjusting the cathode potential of the television camera tube (1) such that the grid and cathode potentials are more positive the brighter the image location corresponding to the respective output signal of the circuit arrangement (14, 15), the memory (15) comprising means for storing a television image and means for reading out the stored television image synchronously with the deflection of the electron beam of the camera tube (1), said memory (15) being operable for picking up one television field and subsequent to storage of the television field, being operable synchronously with the movement of the beam of the camera tube (1) with the series circuit (14, 15) supplying an output signal synchronous with the deflection of the beam of the camera tube and representing a blurred video image conforming to the low frequency components of the video signal tapped off from the signal plate.

2. A system according to claim 1, characterized in that a threshold value circuit (16) is connected between the output of the circuit arrangement (14, 15) and the means (17) for adjusting the cathode potential, said threshold value circuit being operable to transmit only those signal components corresponding to image locations which exceed a predetermined brightness.

3. A system according to claim 1, characterized in that the low pass filter (14) is connected before the memory (15).

* * * * *